US011982456B2

United States Patent
Morita et al.

(10) Patent No.: US 11,982,456 B2
(45) Date of Patent: May 14, 2024

(54) AIR COMPRESSOR

(71) Applicant: Hitachi Industrial Equipment Systems Co., Ltd., Tokyo (JP)

(72) Inventors: Kenji Morita, Tokyo (JP); Shigeyuki Yorikane, Tokyo (JP); Masahiko Takano, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 168 days.

(21) Appl. No.: 17/597,196

(22) PCT Filed: May 13, 2020

(86) PCT No.: PCT/JP2020/019079
§ 371 (c)(1),
(2) Date: Dec. 29, 2021

(87) PCT Pub. No.: WO2021/002098
PCT Pub. Date: Jan. 7, 2021

(65) Prior Publication Data
US 2022/0243731 A1 Aug. 4, 2022

(30) Foreign Application Priority Data

Jul. 2, 2019 (JP) ................................. 2019-123400

(51) Int. Cl.
*F04C 28/06* (2006.01)
*F04B 39/02* (2006.01)
(Continued)

(52) U.S. Cl.
CPC ............... *F24F 11/62* (2018.01); *F04B 39/02* (2013.01); *F04B 39/06* (2013.01); *F04B 49/06* (2013.01);
(Continued)

(58) Field of Classification Search
CPC ............... F24F 2130/10; F24F 2110/12; F24F 2110/10; F24F 11/61; F24F 11/30;
(Continued)

(56) References Cited

U.S. PATENT DOCUMENTS 8,219,249 B2 * 7/2012 Harrod ................. G05B 19/042
62/155
11,313,570 B2 * 4/2022 Dong ....................... F24F 11/30
(Continued)

FOREIGN PATENT DOCUMENTS

CN 108870652 A 11/2018
JP 2003-135906 A 5/2003
(Continued)

OTHER PUBLICATIONS

International Search Report (PCT/ISA/210) issued in PCT Application No. PCT/JP2020/019079 dated Jun. 30, 2020 with English translation (seven (7) pages).
(Continued)

*Primary Examiner* — Peter J Bertheaud
(74) *Attorney, Agent, or Firm* — Crowell & Moring LLP

(57) ABSTRACT

A position information antenna 22b receives a position signal including position information about a sending source (satellite, base station, or the like) of a positioning radio wave. A communication antenna 22a transmits position information about a compressor 100 (air compressor) that compresses the air and receives meteorological information corresponding to the position of the compressor 100 from a server on a cloud. A controller 13 specifies the position of the compressor 100 from the position signal received by the position information antenna 22b and controls the compressor 100 on the basis of the meteorological information corresponding to the position of the compressor 100 received by the communication antenna 22a.

11 Claims, 11 Drawing Sheets

(51) Int. Cl.

| | | |
|---|---|---|
| *F04B 39/06* | (2006.01) | |
| *F04B 49/06* | (2006.01) | |
| *F04B 49/10* | (2006.01) | |
| *F04C 18/16* | (2006.01) | |
| *F04C 28/28* | (2006.01) | |
| *F24F 11/30* | (2018.01) | |
| *F24F 11/58* | (2018.01) | |
| *F24F 11/61* | (2018.01) | |
| *F24F 11/62* | (2018.01) | |
| *F24F 11/64* | (2018.01) | |
| *F24F 11/65* | (2018.01) | |
| *F24F 110/10* | (2018.01) | |
| *F24F 110/12* | (2018.01) | |
| *F24F 130/10* | (2018.01) | |
| *F25B 13/00* | (2006.01) | |
| *F25B 49/02* | (2006.01) | |
| *G05B 15/02* | (2006.01) | |
| *G05D 23/19* | (2006.01) | |
| *F24F 140/60* | (2018.01) | |

(52) U.S. Cl.
CPC .............. *F04B 49/10* (2013.01); *F04C 18/16* (2013.01); *F04C 28/06* (2013.01); *F04C 28/28* (2013.01); *F24F 11/30* (2018.01); *F24F 11/58* (2018.01); *F24F 11/61* (2018.01); *F24F 11/64* (2018.01); *F24F 11/65* (2018.01); *F25B 13/00* (2013.01); *F25B 49/022* (2013.01); *G05B 15/02* (2013.01); *F04C 2240/81* (2013.01); *F05D 2270/311* (2013.01); *F24F 2110/10* (2018.01); *F24F 2110/12* (2018.01); *F24F 2130/10* (2018.01); *F24F 2140/60* (2018.01); *F25B 2700/2106* (2013.01); *G05B 2219/2614* (2013.01); *G05B 2219/2642* (2013.01); *G05D 23/1951* (2013.01); *Y02B 30/70* (2013.01)

(58) Field of Classification Search
CPC .. F24F 11/65; F24F 11/62; F24F 11/46; F24F 11/64; F24F 11/58; F24F 2140/60; G05B 15/02; G05B 2219/2614; G05B 2219/2642; F25B 49/022; F25B 2700/2106; F25B 13/00; F04C 18/16; F04C 2240/81; F04C 28/28; F04C 29/04; Y02B 30/70; F04B 49/06; F04B 39/06; F04B 39/02; F04B 49/10; F05D 2270/311; G05D 23/1951

See application file for complete search history.

(56) References Cited

U.S. PATENT DOCUMENTS

| | | | |
|---|---|---|---|
| 2015/0361984 A1* | 12/2015 | Ohta | ........................ F04B 39/06 418/83 |
| 2017/0368906 A1 | 12/2017 | Inui et al. | |
| 2020/0400334 A1 | 12/2020 | Ariga | |

FOREIGN PATENT DOCUMENTS

| | | |
|---|---|---|
| JP | 2004-325034 A | 11/2004 |
| JP | 2007-95655 A | 4/2007 |
| JP | 2009-37870 A | 2/2009 |
| JP | 2016-102478 A | 6/2016 |
| JP | 2017-226397 A | 12/2017 |
| JP | 2019-20034 A | 2/2019 |
| WO | WO 2018/025427 A1 | 2/2018 |

OTHER PUBLICATIONS

Japanese-language Written Opinion (PCT/ISA/237) issued in PCT Application No. PCT/JP2020/019079 dated Jun. 30, 2020 (four (4) pages).

International Preliminary Report on Patentability (PCT/IB/338 & PCT/IB/373) issued in PCT Application No. PCT/JP2020/019079 dated Jan. 13, 2022, Including English translation of document C2 (Japanese-language Written Opinion (PCT/ISA/237), filed on Dec. 29, 2021) (six (6) pages).

Chinese-language Office Action issued in Chinese Application No. 202080046145.9 dated Apr. 19, 2023 with English translation (14 pages).

\* cited by examiner

FIG.3A

Point Meteorological Information    Info3

| COMPRESSOR 1 | 00:00-03:00 | 03:00-06:00 | 06:00-09:00 | 09:00-12:00 | 15:0-18:00 | 21:00-24:00 |
|---|---|---|---|---|---|---|
| WEATHER | RAIN | RAIN | SNOW | RAIN | CLOUDY | FINE |
| ATMOSPHERIC TEMPERATURE | 2°C | 0°C | −2°C | 8°C | 12°C | 5°C |
| HUMIDITY | 60% | 50% | 25% | 60% | 30% | 30% |
| BAROMETRIC PRESSURE | 1009hpa | 1001hpa | 1005hpa | 1012hpa | 1017hpa | 1012hpa |

FIG.3B

Position Information    Info1

| | LATITUDE | LONGITUDE | ELEVATION |
|---|---|---|---|
| COMPRESSOR 1 | 35.681167 | 139.767052 | 3m |
| COMPRESSOR 2 | 43.068625 | 141.350801 | 20m |
| COMPRESSOR 3 | 26.206468 | 127.652248 | 3m |
| COMPRESSOR 4 | 36.141191 | 137.251445 | 573m |

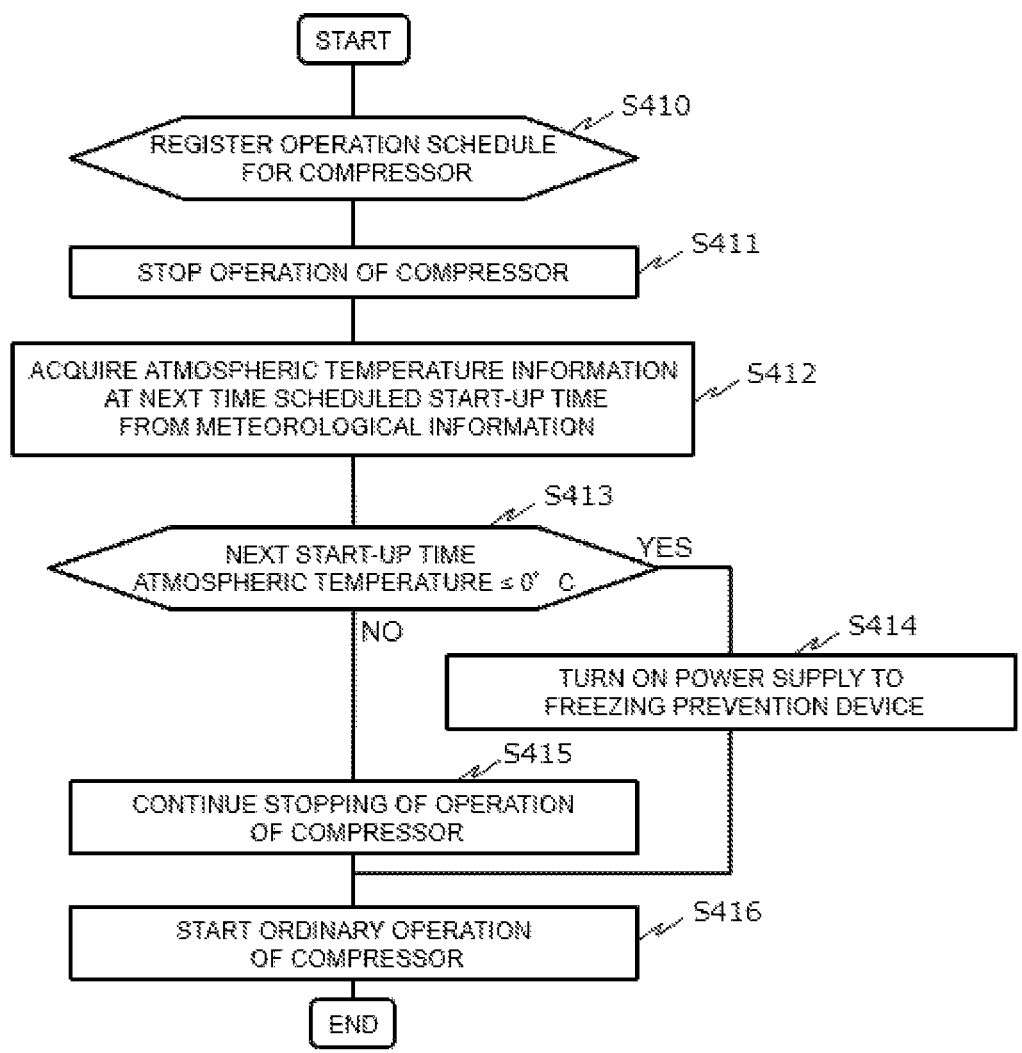

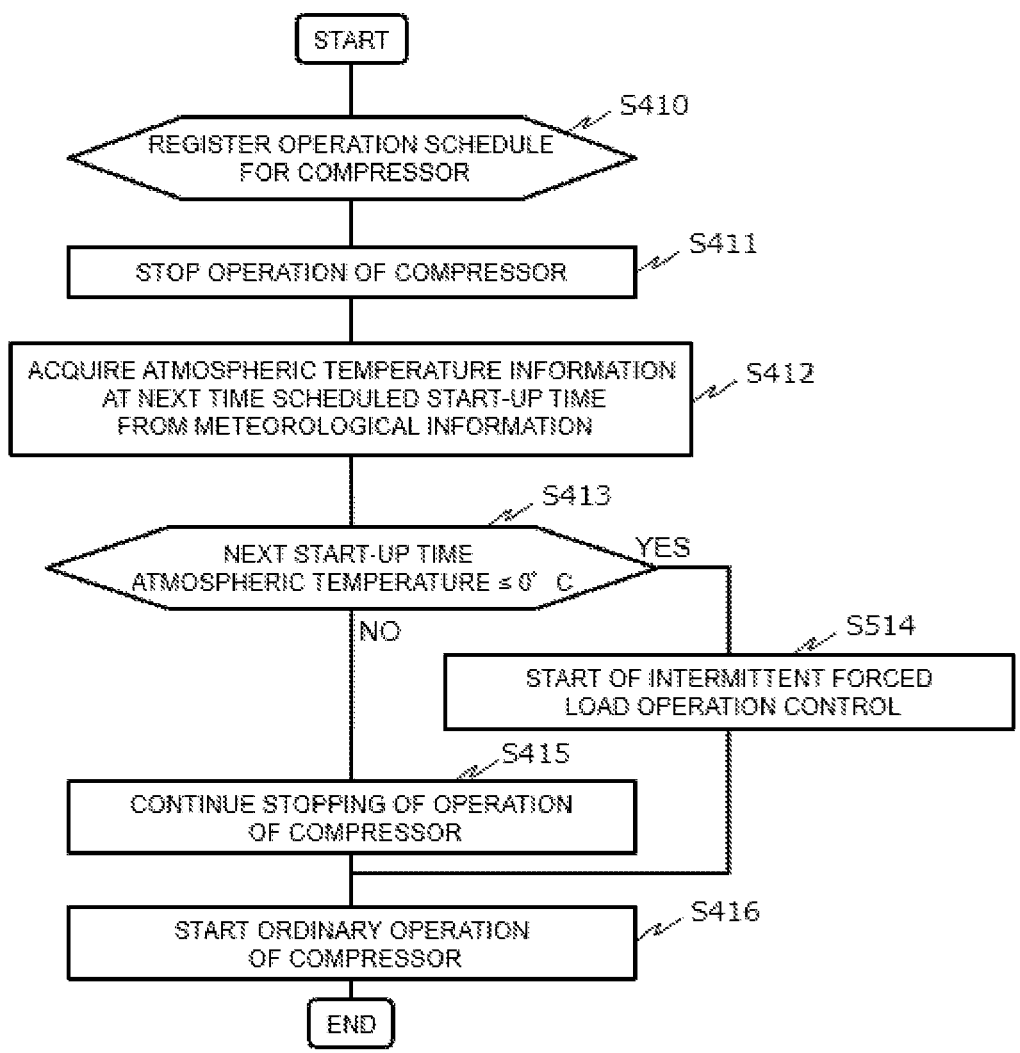

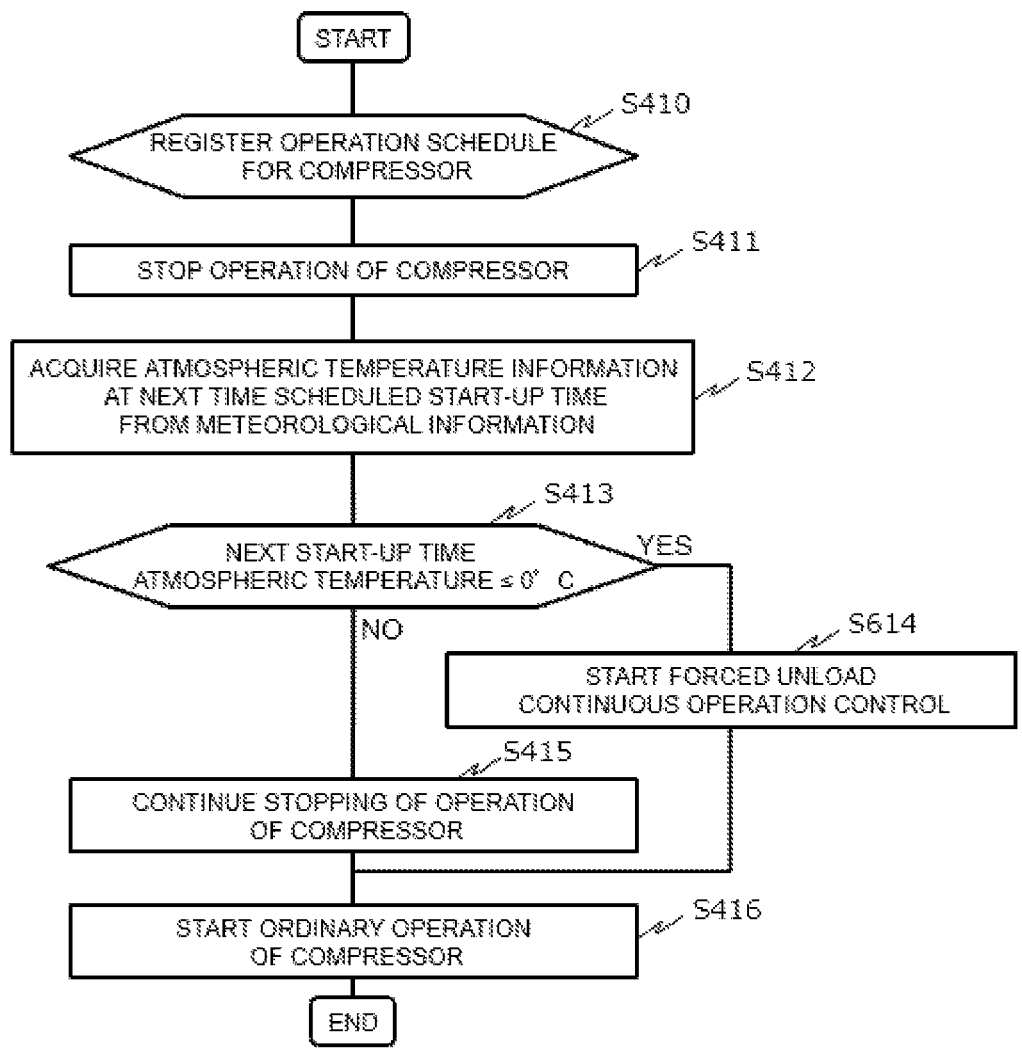

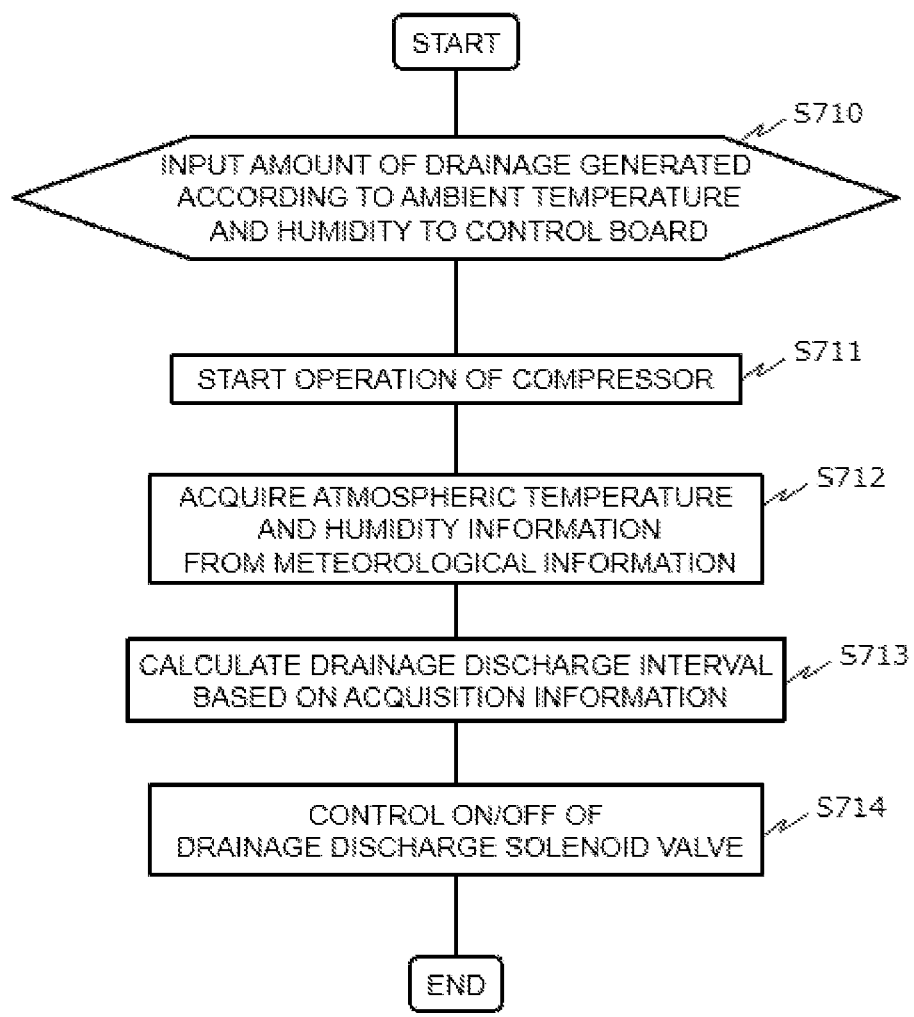

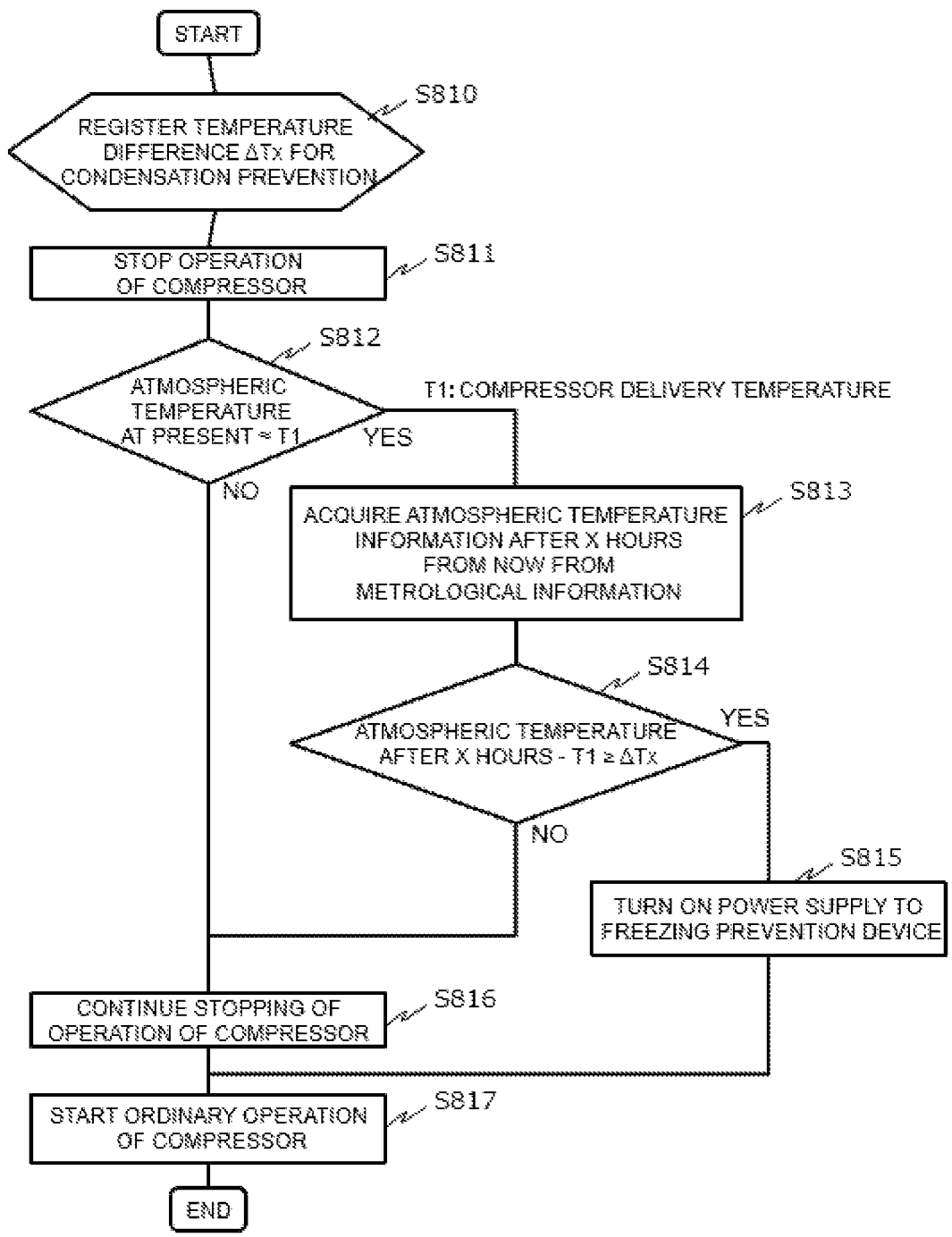

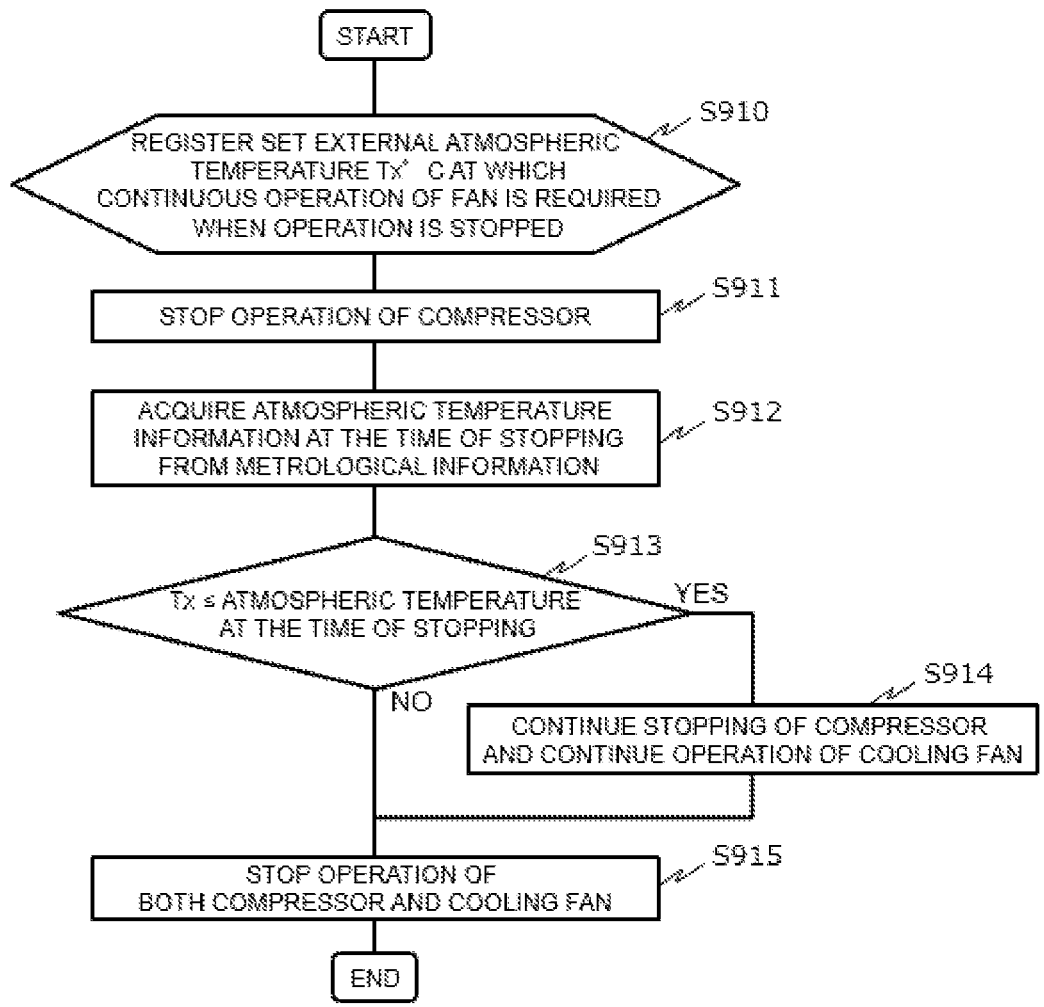

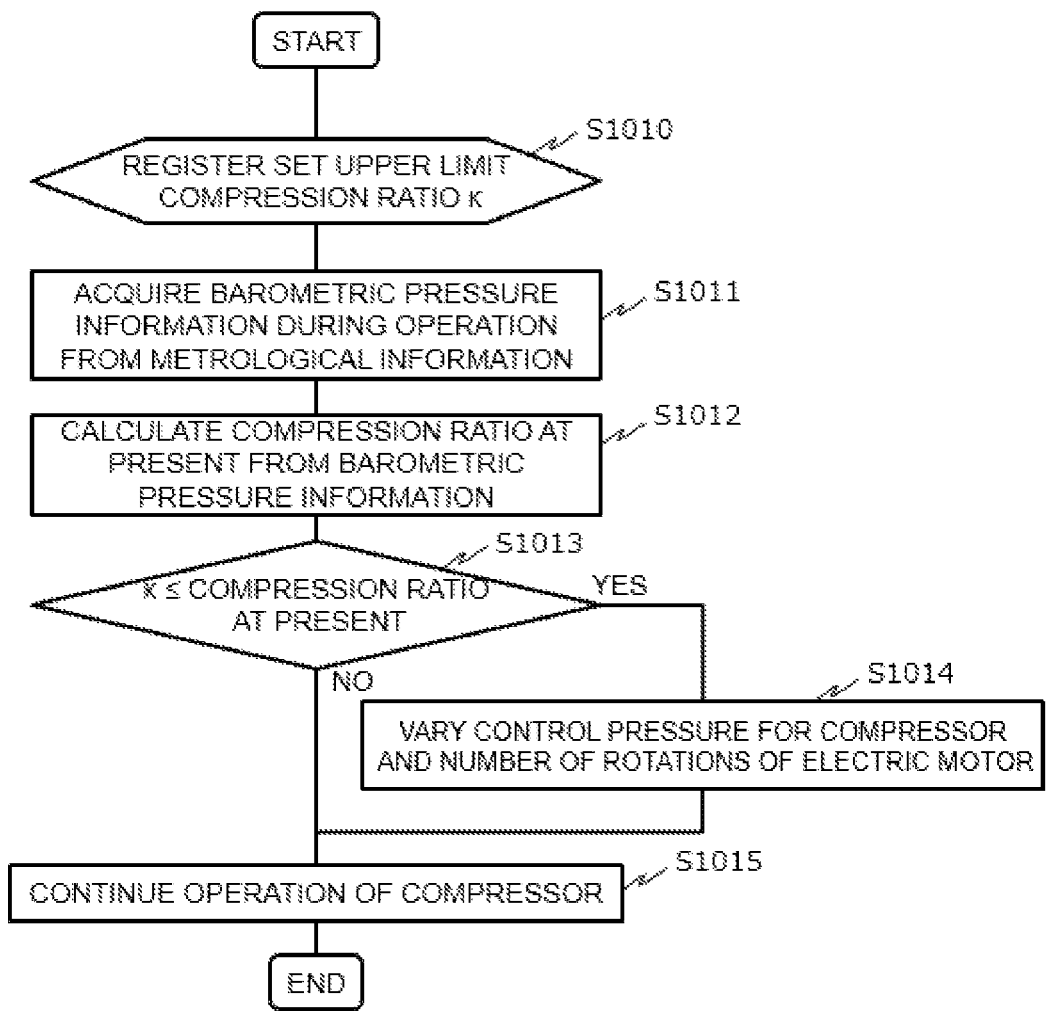

AIR COMPRESSOR

TECHNICAL FIELD

The present invention relates to an air compressor.

BACKGROUND ART

First, a detection method of an abnormality or a failure, drainage discharge control, a cold region specification machine and so forth of a general air compressor are described.

An air compressor has, as means for detecting an abnormality or a failure, a delivery temperature sensor or a pressure sensor attached to various portions thereof and is generally provided with a function for deciding, when such a phenomenon that a signal (output value) of each sensor is higher than or lower than a set value determined in advance, an abnormality, a failure, or the like and displaying the decision result on a screen provided at an operation unit. Then, only signals of the sensors attached to the air compressor itself are used to perform control.

For processing of drainage (condensed water) generated during operation, a method of slightly opening a valve at the terminal end of a drainage discharge route, another method of providing an orifice or the like in the middle of the route such that the drainage is discharged by an appropriate amount without diminishing the amount of air, and like methods are available. Also a method of performing drainage discharge intermittently by drainage discharge control or the like is available. However, in most methods, the discharge interval is fixed.

Where a compressor is installed in such a place as a cold region, the ambient temperature of the compressor sometimes goes below freezing. Especially, in a refueling screw air compressor, the viscosity of lubricant stored in the inside of the compressor main body becomes high. When the compressor is operated in this state, the torque necessary for start-up is insufficient, resulting in failure in start-up (start-up congestion). In order to avoid such a defect as just described, it is necessary to attach a freezing prevention device such as a cord heater around the compressor main body or the like and render the freezing prevention device operative before operation of the compressor thereby to reduce the viscosity of the lubricant. The operation of the freezing prevention device is, in most cases, performed by a manual operation, and the power supply switch for the freezing prevention device sometimes fails to be turned on/off appropriately due to a human error. As a result, start-up congestion due to forgetting to turn on or waste of power consumption due to forgetting to turn off occurs.

Such operation control of a compressor is generally performed by a method of detecting an abnormality or a failure by connecting (inputting) signals of sensors attached to the compressor itself to the compressor by wired connection or a method of performing operation management by human operation like that of a freezing prevention device, and is not control that utilizes information other than that from the sensors or devices attached to the compressor.

Here, Patent Document 1 discloses a technology of utilizing meteorological information in control of an air conditioning apparatus. The air conditioning apparatus of Document 1 performs remote control taking the temperature at the installation place of the air conditioning apparatus and so forth into consideration from meteorological information, and controls on/off of a refrigeration cycle by utilizing the obtained meteorological information and temperature information obtained from a temperature sensor or the like provided on the air conditioning apparatus to thereby perform room temperature management.

PRIOR ART DOCUMENT

Patent Document

Patent Document 1: JP-2004-325034-A

SUMMARY OF THE INVENTION

Problem to be Solved by the Invention

The technology of Patent Document 1 controls an air conditioning apparatus on the basis of meteorological information to perform room temperature management, and this is a function on an extension line of general air conditioning control. Accordingly, Patent Document 1 does not disclose a function about maintenance of the air conditioning apparatus.

The object of the present invention resides in provision of an air compressor that facilitates acquisition of meteorological information corresponding to the position of an air compressor such that control according to the meteorological information can be performed.

Means for Solving the Problem

In order to achieve the object described above, according to the present invention, an air compressor for compressing the air includes: a position information antenna that receives a position signal including position information about a sending source of a positioning radio wave; a communication antenna that transmits position information about the air compressor and receives metrological information corresponding to the position of the air compressor from a server on a cloud; and a controller that specifies the position of the air compressor from the position signal and controls the air compressor based on the metrological information corresponding to the position of the air compressor.

Advantages of the Invention

According to the present invention, it is possible to facilitate acquisition of meteorological information corresponding to the position of the air compressor and perform control according to the meteorological information. Other subjects, configurations, and advantages than those described above are made clear by the following description of embodiments.

BRIEF DESCRIPTION OF THE DRAWINGS

FIG. 3A is a data structure diagram of point meteorological information depicted in FIG. 2B.

FIG. 3B is a data structure diagram of position information depicted in FIG. 2B.

FIG. 4 is a flow chart depicting start-up congestion prevention control by acquisition of atmospheric temperature information in the first embodiment.

FIG. 5 is a flow chart depicting start-up congestion prevention control by acquisition of atmospheric temperature information in a modification of the first embodiment.

FIG. 6 is a flow chart depicting start-up congestion prevention control by acquisition of atmospheric temperature information in another modification of the first embodiment.

FIG. 7 is a flow chart depicting drainage discharge control of a compressor by acquisition of atmospheric temperature and humidity information in a second embodiment.

FIG. 8 is a flow chart depicting dry operation control of a compressor by acquisition of atmospheric temperature information in a third embodiment.

FIG. 9 is a flow chart depicting operation control of a compressor cooling fan by acquisition of atmospheric temperature information in a fourth embodiment.

FIG. 10 is a flow chart depicting operation control of a compressor by acquisition of barometric pressure information in a fifth embodiment.

MODES FOR CARRYING OUT THE INVENTION

In the following, modes for carrying out the present invention are described with reference to the drawings.

First Embodiment

Figure 1:
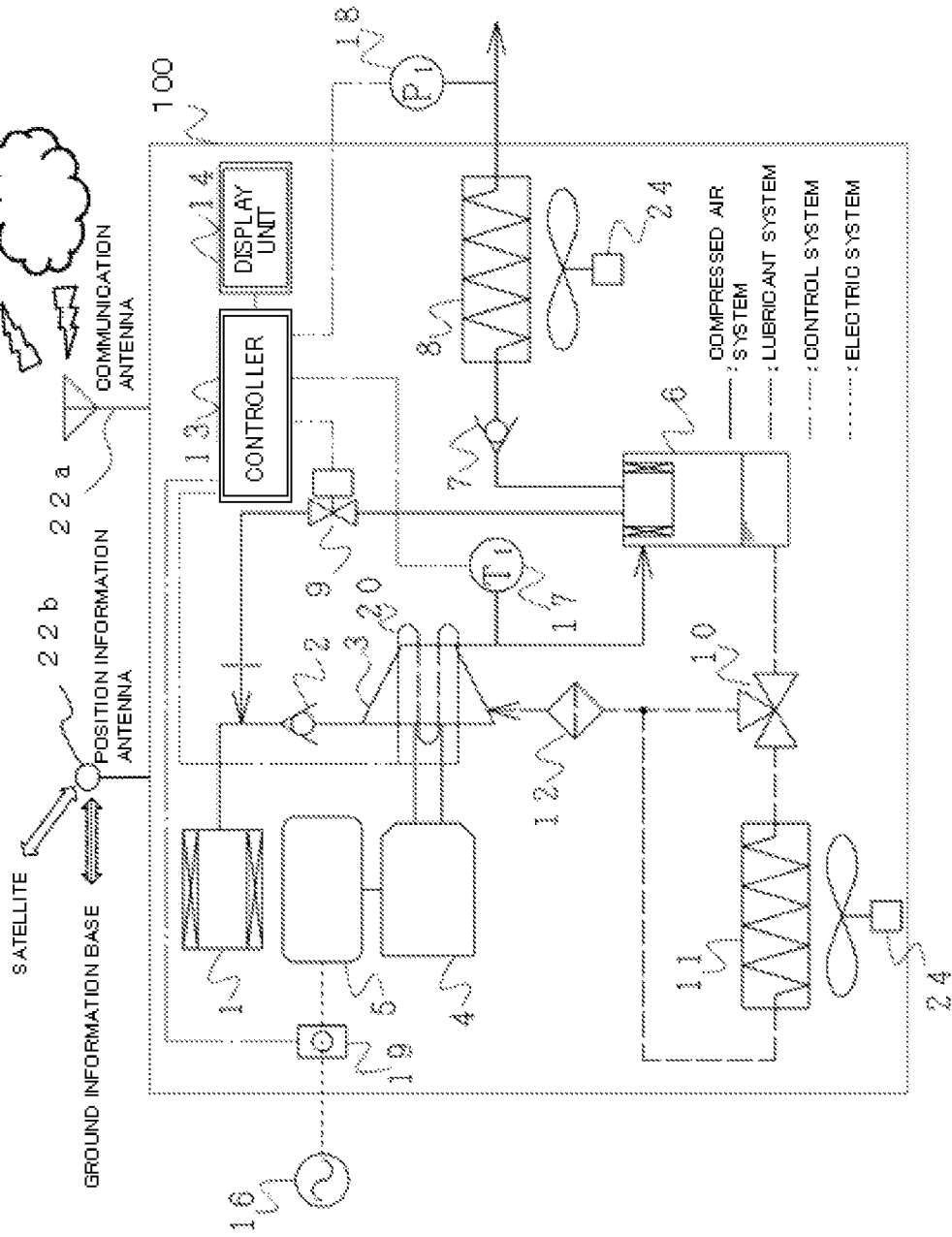
FIG. 1 is a block diagram of an air compressor connected to a cloud environment in a first embodiment.

FIG. 1 schematically depicts a configuration of a refueling screw air compressor according to a first embodiment of the present invention. It is to be noted that the air compressor is an apparatus that compresses the air.

In the refueling screw air compressor 100 (hereinafter referred to sometimes merely as "compressor 100," when a compressor main body 3 is driven by an electric motor 4, dust in the atmospheric air is removed by a suction filter 1 and the atmospheric air is sucked into the compressor main body 3 through a suction throttle valve 2. The atmospheric air sucked in is boosted by the compressor main body 3, and at a stage at which the pressure of the atmospheric air reaches a predetermined pressure, the compressed air is delivered from a delivery port of the compressor main body 3. In the present embodiment, the compressor main body 3 is configured from a pair of screw rotors and so forth.

The compressed air from the compressor main body 3 flows into an oil separation tank 6, at which the compressed air and lubricant are separated from each other. The compressed air from the oil separation tank 6 is cooled by an after cooler 8 and then fed into equipment used by a user.

On the other hand, the lubricant from the oil separation tank 6 is fed, when the oil temperature thereof is lower than a threshold value for a temperature control valve 10, from the temperature control valve 10 to the compressor main body 3 through an oil filter 12. When the oil temperature is higher than the threshold value, the lubricant flows from the temperature control valve 10 to an oil cooler 11 side, at which it is cooled such that the temperature thereof enters a predetermined temperature range. Thereafter, the lubricant is supplied into the compressor main body 3 through the oil filter 12.

As physical quantity detection means, a delivery temperature sensor 17 attached immediately after the exit of the compressor main body 3, a delivery line pressure sensor 18 attached to the unit exit, and a current detector 19 attached to a power supply line for the electric motor 4 or an inverter 5 are provided. Output values of the sensors are subjected to an arithmetic process by a controller 13, and contents according to the process are displayed on a display unit 14.

Further, the compressor 100 includes a communication antenna 22a and a position information antenna 22b. The communication antenna 22a is communication means for performing communication with a cloud server (management server or the like) hereinafter described through a communication network. Although, in the present example, wireless communication is applied, alternatively wired communication may be applied.

In particular, the communication antenna 22a transmits position information about the compressor 100 (air compressor) and receives meteorological information corresponding to the position of the compressor 100 from a server on the cloud. The meteorological information includes at least one of atmospheric temperature, humidity, and barometric pressure forecasted at the position of the compressor 100 (air compressor). Consequently, the compressor 100 need not include a temperature sensor for atmospheric temperature measurement, a humidity sensor, a pressure sensor for barometric pressure measurement, and so forth, and the manufacturing cost thereof can be reduced.

The position information antenna 22b is an antenna that receives a position measurement signal sent from the outside. In the present example, in order to specify the position of the compressor 100, a position measurement method that uses satellites by the GNSS (Global Navigation Satellite System) and a position measurement method that utilizes a ground information base such as a base station of a terrestrial wireless communication network (mobile network, Wifi (registered trademark) or the like) are used. It is to be noted that the present invention can be carried out using only one of such various position measurement methods.

In particular, the position information antenna 22b receives a position signal including position information about a sending source (satellite, base station, or the like) of radio waves for positioning.

As the GNSS, for example, GPS, GLONASS, GALILEO, QZSS, and so forth can be applied. As the terrestrial wireless communication network, for example, public wireless communication networks for a portable telephone (3G, 4G, LTE, 5G, PHS, and so forth) are available. Further, also a relay terminal or the like whose installation position is known can be applied if it complies with a medium range wireless communication standard such as Wifi (registered trademark). Furthermore, also it is possible to apply LORAN (Long Range Navigator).

It is to be noted that the ground information base is not limited to a stationary type base station and includes a base station installed in a floating body such as an aircraft, an airship, a balloon, or a drone whose position can be specified, an underground installation, and so forth.

In the controller 13, various functioning sections hereinafter described perform information communication with a cloud server through a communication network, acquisition and external transmission and reception of position information about the compressor 100, and so forth.

In particular, the controller 13 specifies the position of the compressor 100 (air compressor) from a position signal received by the position information antenna 22b and controls the compressor 100 on the basis of meteorological information corresponding to the position of the compressor 100 received by the communication antenna 22a. This facilitates acquisition of meteorological information corresponding to the position of the compressor 100, and control (for maintenance) according to the meteorological information can be performed.

(Configuration of Controller)

Figure 2A:
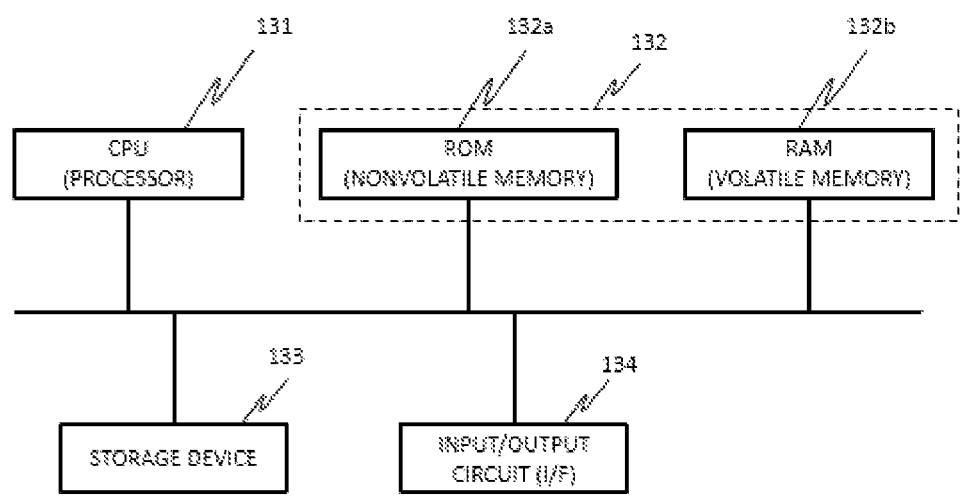
FIG. 2A is a block diagram of a hardware configuration of a controller depicted in FIG. 1.
Figure 2B:
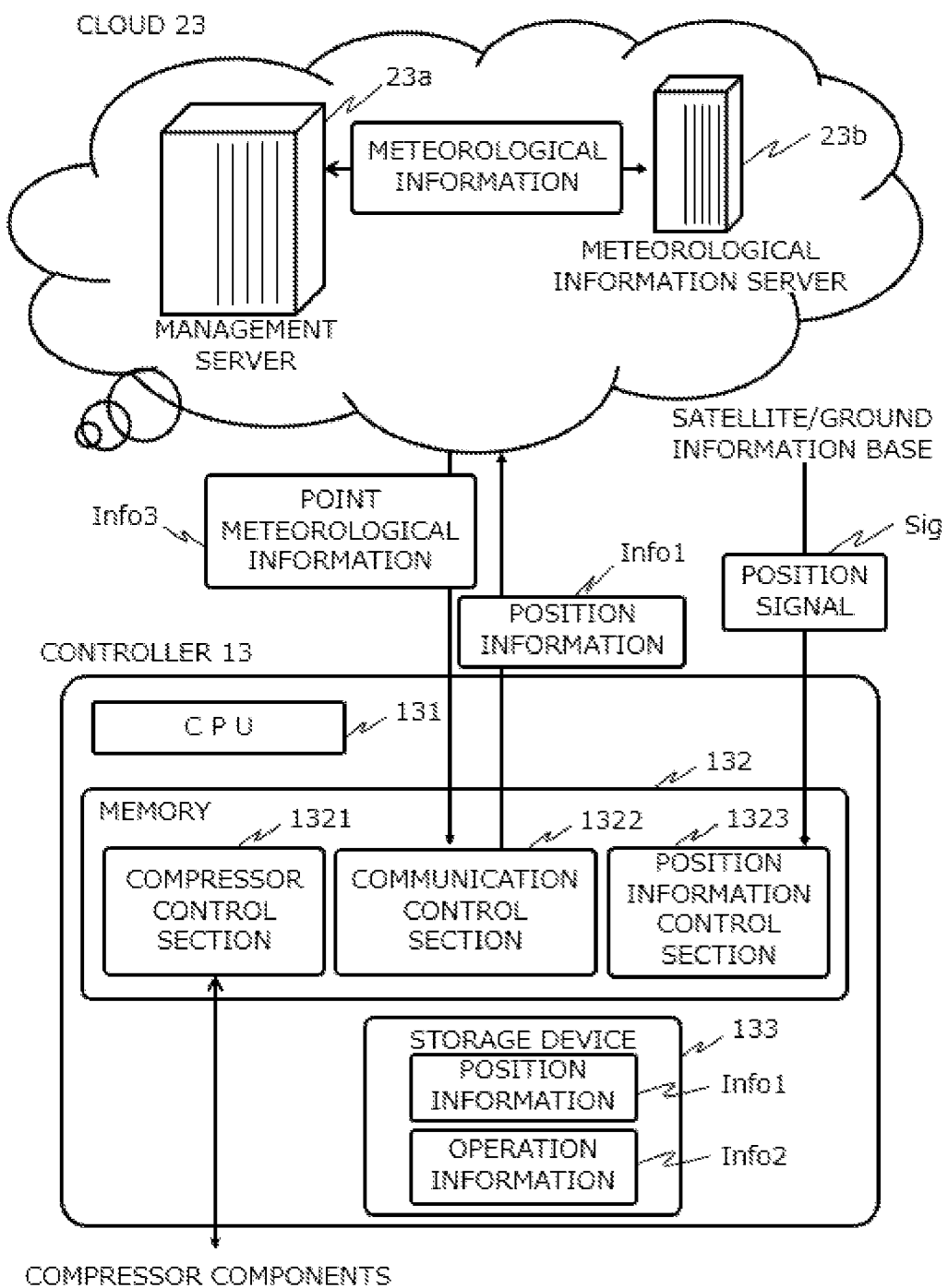
FIG. 2B is a functional block diagram of the controller depicted in FIG. 1.

Now, a configuration of the controller 13 of the present embodiment is described with reference to FIGS. 2A and 2B. FIG. 2A is a view depicting a hardware configuration of the controller 13, and FIG. 2B is a block diagram schematically depicting a functional configuration of the controller 13.

As depicted in FIG. 2A, the controller 13 is configured, as one example, from a CPU 131 (Central Processing Unit) as a processor, a ROM 132a (Read Only Memory) as a nonvolatile memory, a RAM 132b (Random Access Memory) as a volatile memory, a storage device 133, an input/output circuit 134 as an I/F (Interface), and so forth. It is to be noted that the input/output circuit 134 is configured, for example, from an input buffer, an output buffer, a pull-up resistor, a pull-down resistor, and so forth.

The CPU 131 implements various functions by executing a program stored in the ROM 132a. In particular, as depicted in FIG. 2B, the controller 13 implements various control functioning sections in cooperation with the CPU 131 (semiconductor arithmetic unit) and a program stored in the memory 132.

A compressor control section 1321 is a functioning section that performs control relating to operation of the compressor 100 such as management of various sensor values of the compressor 100 described hereinabove, calculation and output of a frequency command value for the inverter 5 based on the various sensor values, and control of various valve bodies.

A communication control section 1322 is a functioning section that performs communication with a management server 23a through the communication antenna 22a. A position information control section 1323 is a functioning section that receives a position signal Sig from a satellite to specify the position of the compressor 100 by calculation, and receives position information about an LTE base station or receives the position information about the compressor 100 received through an LTE server apparatus (not depicted) from the LTE base station.

The controller 13 further includes the readable and writable storage device 133 that stores position information Info1 and operation information Info2 about various operation set values, operation schedules, and so forth. The storage device 133 is implemented, for example, from a semiconductor storage device or a disk. Such storage information is acquired by a user operation though the display unit 14 that has an input/output interface such as a touch panel or by inputting through the communication antenna 22a and the position information antenna 22b.

It is to be noted that, although, in the description of the present embodiment, the controller 13 is an operation panel fixed to the compressor 100, the present invention is not limited to this, and also it is possible to configure the controller 13 as a portable terminal such that it can perform wireless communication through the Internet, a medium range wireless communication standard such as Wifi (registered trademark), a near field wireless communication standard such as Bluetooth (registered trademark), or the like. Further, the compressor 100 may be configured so as to communicate with the portable terminal by wired communication.

As an example of the configuration of a cloud 23, the management server 23a and a meteorological information server 23b are described. The management server 23a acquires time series meteorological information in a predetermined area from the meteorological information server 23b. In particular, the management server 23a acquires and updates, as metrological information, for example, current to future meteorological information (information in the past may be included), which is metrological forecast data, after every predetermined time interval or at a predetermined timing such as when the meteorological information indicates a change. The meteorological information includes, for example, weather, atmospheric temperature, humidity, barometric pressure, and so forth. The management server 23a transmits the meteorological information in response to a request received from the compressor 100 through a communication network.

Further, the meteorological information to be transmitted may be all or part of meteorological information in all areas the management server 23a holds or may be all or part of meteorological information from within meteorological information about an area relating to the compressor 100 from which the request is received. In particular, in the former case, the compressor 100 performs a process of extracting meteorological information about a relating area from the meteorological information in all areas, and in the latter case, the management server 23a receives position information held by the compressor 100 together with the request of the compressor 100 and transmits only meteorological information (point meteorological information) in a region centered at the present place of the compressor 100 from the position information. In the present embodiment, an example of the latter case is described.

FIGS. 3A and 3B schematically depict examples of point meteorological information Info3 and position information Info1, respectively. FIG. 3A is a view depicting a data structure of the point meteorological information Info3. In the present example, the data structure of a "compressor 1" is exemplified. The point meteorological information includes time series weather, atmospheric temperature, humidity, and barometric pressure within a predetermined time range (in the present example, after every three hours). The management server 23a generates, on the basis of the position information Info1 transmitted from the compressor 100, meteorological information in a predetermined area including the position as the point meteorological information Info3.

Although the point meteorological information Info3 is temporarily stored into the RAM 132b as an example, it may otherwise be stored into the storage device 133. FIG. 3B is a view depicting a data structure of the position information Info1. In this example, although position information about four compressors is depicted, in principle, one compressor 100 calculates, holds, and transmits and receives one piece of position information. The position information Info1 includes, for example, latitude, longitude, and elevation of the compressor.

The configuration of the present embodiment is such as described above. In the following, various functions of the compressor 100 according to the configuration are described in detail.

(Function)

In the case of specifications for cold regions or the like, it is necessary to wrap such a freezing prevention device as a cord heater 20 around the compressor main body 3 and turn on the cord heater 20 before start of operation thereby to preheat the compressor main body 3. In particular, the compressor 100 (air compressor) includes the cord heater 20 (heater) that warms the inside of the compressor 100. At the start of operation, if the compressor 100 can be operated without causing start-up congestion, then the cord heater 20 is turned off, but if start-up congestion occurs, then it is necessary to continue the preheating for a while and perform operation of the compressor again.

FIG. 4 depicts a control flow of the compressor 100 that can prevent start-up congestion by acquisition of atmospheric temperature from within the meteorological information Info3. The description of the present example is described taking an air compressor that includes a scheduled operation function as an example.

An operation schedule of the compressor 100 is registered in advance. When operation stopping time comes, the compressor 100 is stopped. After the stop, the compressor 100 acquires atmospheric temperature information at next start-up time from the management server 23a (cloud data server). Then, if the atmospheric temperature at the time is equal to or lower than the freezing point (equal to or lower than zero degrees Celsius), the compressor 100 turns on the power supply to the cord heater 20 (freezing prevention device) to heat the compressor main body 3 thereby to reduce the viscosity of the lubricant stored in the inside of the main body.

In particular, when the atmospheric temperature forecasted at the position of the compressor 100 at the scheduled start-up time of the compressor 100 (air compressor) is a low temperature equal to or lower than zero degrees Celsius (first threshold value), the controller 13 turns on the power supply to the cord heater 20 (heater). Consequently, the viscosity of the lubricant used in the compressor 100 decreases, and start-up congestion of the compressor 100 can be prevented.

In particular, the operation information Info2 (refer to FIG. 2B) of the compressor 100 is stored into the storage device 133 first (S410). The CPU 131 stops switching of the inverter 5 according to an operation schedule included in the operation information Info2. Consequently, the CPU 131 stops driving of the electric motor 4 to stop operation of the compressor 100 (S411).

The CPU 131 transmits the position information Info1 to the management server 23a and receives point meteorological information Info3 corresponding to the position information Info1 from the management server 23a. In the present embodiment, the point meteorological information Info3 (meteorological information) includes atmospheric temperature forecasted at the position of the compressor 100 at the scheduled start-up time of the compressor 100 (air compressor). Consequently, the air compressor can utilize the atmospheric temperature forecasted at the position of the air compressor at the scheduled start-up time. Therefore, the controller need not perform high-load calculation for forecasting atmospheric temperature.

The CPU 131 acquires the atmospheric temperature at the next start-up time from the point meteorological information Info3 (S412). The CPU 131 decides whether or not the atmospheric temperature at the next start-up time is equal to or lower than the freezing point (S413). In a case where the atmospheric temperature at the next start-up time is equal to or lower than the freezing point (S413: YES), the CPU 131 turns on the power supply to the cord heater 20 (freezing prevention device) (S414) and advances its processing to S416. On the other hand, in a case where the atmospheric temperature at the next start-up time is higher than the freezing point (S413: NO), the CPU 131 continues the operation stop of the compressor 100 (S415).

The CPU 131 starts ordinary operation of the compressor 100 according to the operation schedule (S416).

Consequently, at the next start-up time, the compressor 100 can perform normal operation without suffering from start-up congestion. On the other hand, in a case where the atmospheric temperature at the next start-up time is higher than the freezing point (zero degrees Celsius), the power supply to the cord heater 20 (freezing prevention device) is kept off.

Modification

In place of turning on of the power supply (S414) to the freezing prevention device of FIG. 4, control start of intermittent forced load operation of the compressor 100 of FIG. 5 (S514) or control start of forced unload continuous operation of FIG. 6 (S614) may be performed. Further, also in a case where the scheduled operation function is not used, if it is forecasted that the atmospheric temperature after the stop is equal to or lower than the freezing point, then freezing may be prevented such that one of turning on of the power supply to the freezing prevention device, intermittent forced load operation, and forced unload continuous is performed for operation (control state) of the compressor 100.

Second Embodiment

The drainage discharge control of compressed air intermittently discharges drainage by tuning on/off a drainage discharge solenoid valve at certain fixed intervals. According to this control, since the turning on/off is performed at intervals at which an assumed maximum amount of drainage generated can be processed, not only drainage but also compressed are discharged when the humidity is low, and thus the compressed air is consumed wastefully.

FIG. 7 depicts a control flow chart by which the drainage discharge interval can be optimized from acquisition of atmospheric temperature and humidity information.

In the present embodiment, amounts of drainage generated when the temperature and the humidity around the compressor 100 are changed are recorded into the storage device 133 of the compressor control board in advance, and atmospheric temperature and humidity information is fetched from the cloud 23 and appropriate drainage discharge is performed in response to the combination of the atmospheric temperature and the humidity to prevent unnecessary discharge of the compressed air. Thus, the power consumption can be suppressed thereby.

In particular, in the present embodiment, the compressor 100 (air compressor) includes a drainage discharge solenoid valve (solenoid valve) in a discharge path for drainage. The controller 13 calculates a discharge interval of drainage from an amount of drainage according to atmospheric temperature and humidity forecasted at the position of the compressor 100 when the compressor 100 (air compressor) operates, and controls the drainage discharge solenoid valve (solenoid valve) to discharge drainage at the discharge intervals. Consequently, since drainage is discharged according to the atmospheric temperature and the humidity, the compressed air can be suppressed from being consumed wastefully.

Further, not the relation between the temperature and humidity and the amount of drainage by a pre-examination may be recorded into the storage device 133 of the compressor control board, but a relational expression of the amount of drainage generated that is calculated from the temperature (atmospheric temperature), humidity, and pressure (barometric pressure) may be recorded in advance.

In particular, combinations of atmospheric temperature and humidity and corresponding amounts of drainage are first stored into the storage device 133 (S710). The amount of drainage is, as an example, an amount of drainage with respect to an intake air in a standard barometric pressure per unit volume. The CPU 131 starts operation of the compressor 100 in response to an operation by a user, an operation schedule, or the like (S711). The CPU 131 transmits position information Info1 to the management server 23a and receives point meteorological information Info3 corresponding to the position information Info1 from the management server 23a. The point meteorological information Info3 (meteorological information) includes atmospheric temperature and humidity forecasted at the position of the compressor 100 when the compressor 100 (air compressor) operates.

The CPU 131 acquires the atmospheric temperature and the humidity at present from the point meteorological information Info3 (S712). The CPU 131 reads out an amount of drainage corresponding to the combination of the atmospheric temperature and the humidity acquired at S712 from the storage device 133, and calculates a drainage discharge interval from the amount of drainage (S713). The CPU 131 controls on/off of the drainage discharge solenoid valve according to the drainage discharge interval (S714).

Third Embodiment

In a case where the compressor 100 is installed in a cold region, if operation of the compressor 100 is stopped for a certain fixed period of time, then also the temperature of the inside of the compressor drops to a level substantially equal to that of the ambient atmospheric temperature. If the ambient temperature of the compressor 100 rises rapidly from this state, then the temperature of internal parts of the compressor does not follow up the ambient temperature change but remains a low temperature, and condensation on the surface of the compressor main body 3 and its components occurs, resulting in the possibility of rust. In the case of electric parts, short-circuiting on the substrate by the condensation occurs, resulting in the possibility that operation may be disabled.

FIG. 8 depicts a control flow of drying operation of the inside of the compressor 100 by acquisition of atmospheric temperature information. In the present embodiment, in a case where information about a rapid temperature change is acquired from meteorological information, intermittent forced load operation of the compressor 100 is performed or the power supply to the cord heater 20 (freezing prevention device) is turned on to prevent occurrence of condensation on internal parts of the compressor.

In particular, when the difference between the atmospheric temperature after a predetermined period of time forecasted at the position of the compressor 100 (air compressor) and the atmospheric temperature at present is equal to or greater than a temperature difference $\Delta Tx$ for condensation prevention (second threshold value), the controller 13 turns on the power supply to the cord heater 20 (heater). Consequently, condensation in the inside of the compressor 100 can be prevented.

In particular, the temperature difference $\Delta Tx$ for condensation prevention is stored into the storage device 133 (S810). Here, if the difference between the internal temperature of the compressor 100 (temperature T1 of delivery air of the compressor) and the external temperature is smaller than $\Delta Tx$, then condensation does not occur. The CPU 131 transmits position information Info1 to the management server 23a and receives point meteorological information Info3 corresponding to the position information Info1 from the management server 23a. The point meteorological information Info3 (meteorological information) includes a time series of atmospheric temperature forecasted at the position of the compressor 100 (air compressor).

The CPU 131 acquires atmospheric temperature at present from the point meteorological information Info3 and decides whether or not the atmospheric temperature at present is equal to the temperature T1 of the delivery air (S812). In a case where the atmospheric temperature at present is equal to the temperature T1 of delivery air (S812: YES), the CPU 131 acquires atmospheric temperature after X hours (X>0) from the point meteorological information Info3 (S813).

The CPU 131 decides whether or not the difference between the atmospheric temperature after the X hours and the atmospheric temperature at present is equal to or greater than $\Delta Tx$ (S814). In a case where the difference between the atmospheric temperatures is equal to or greater than $\Delta Tx$ (S814: YES), the CPU 131 turns on the power supply to the cord heater 20 (freezing prevention device) (S815) and advances its processing to S817. On the other hand, in a case where the difference between the atmospheric temperature after the X hours and the atmospheric temperature at present is smaller than $\Delta Tx$ (S814: NO) and in a case where the atmospheric temperature at present is not equal to the temperature T1 of the delivery air (812: NO), the CPU 131 continues the stopping of operation of the compressor 100 (S816).

Thereafter, the CPU 131 starts ordinary operation of the compressor 100 in response to an operation by the user, an operation schedule or the like (S817).

Modification

In place of turning on of the power supply (S815) of the freezing prevention device of FIG. 8, control start of intermittent forced load operation of the compressor 100 of FIG. 5 (S514) or control start of forced unload continuous operation of the compressor 100 of FIG. 6 (S614) may be performed.

Fourth Embodiment

To the electric motor 4 for driving the compressor 100, a self-cooling fan is attached to the motor anti-load side such that, during operation of the compressor, the motor electric motor itself is cooled by cooling wind of the self-cooling fan. In the case of the electric motor 4 for which a self-cooling fan is not provided, a separately provided fan (refer to a cooling fan 24 in FIG. 1) or a unit inside layout is devised such that cooling wind is blown to the periphery of the motor to perform cooling.

Although the compressor is designed such that, during operation thereof, the temperature of the electric motor 4 does not exceed a guaranteed temperature upper limit therefor, heat radiation of the electric motor 4 may not follow up after stopping of operation, and the electric motor 4 sometimes indicates temperature rise. Here, in an environment in which the atmospheric temperature is high like in the summer, there is the possibility that, after stopping, the temperature of the electric motor 4 may exceed the guaranteed temperature therefor.

FIG. 9 depicts a control flow for causing the cooling fan to continue its operation after operation of the compressor is stopped by acquisition of atmospheric temperature information. In the present embodiment, atmospheric temperature information at which the temperature of the electric motor exceeds the guaranteed temperature after stopping of operation is set in advance, and in a case where the atmospheric temperature is higher than the set temperature, on the basis of the atmospheric temperature information acquired at the time of stopping of operation, only the cooling fan of the compressor unit continues to be operated for a fixed period of time thereby to prevent temperature rise of the electric motor and other parts after stopping of operation.

In particular, the compressor 100 (air compressor) includes a cooling fan 24 that cools the inside of the compressor 100. In a case where atmospheric temperature forecasted at the position of the compressor 100 when operation of the compressor 100 (air compressor) is stopped is a high temperature equal to or higher than a predetermined temperature (third threshold value), the controller 13 controls the cooling fan 24 to continue its operation after operation of the compressor 100 is stopped. Consequently, the compressor 100 can be prevented from breaking down due to heat.

In particular, an atmospheric temperature Tx at which continued operation of the cooling fan 24 is required when operation of the compressor 100 is stopped is stored into the storage device 133 (S910). The CPU 131 stops operation of the compressor 100 according to an operation by a user, an operation schedule or the like (S911).

The CPU 131 transmits position information Info1 to the management server 23*a* and receives point meteorological information Info3 corresponding to the position information Info1 from the management server 23*a*. The point meteorological information Info3 (meteorological information) includes atmospheric temperature forecasted at the position of the compressor 100 at the time of stopping of operation of the compressor 100 (air compressor). The CPU 131 acquires the atmospheric temperature at the time of stopping of operation from the point meteorological information Info3 (S912). The CPU 131 decides whether or not the atmospheric temperature at the time of stopping of operation is equal to or higher than the atmospheric temperature Tx (S913).

In a case where the atmospheric temperature at the time of stopping of operation is equal to or higher than the atmospheric temperature Tx (S913: YES), the CPU 131 continues operation of the cooling fan 24 while it continues the stopping of operation of the compressor 100 (S914), and then advances its processing to S915. On the other hand, in a case where the atmospheric temperature at the time of stopping of operation is lower than the atmospheric temperature Tx (S913: NO), the CPU 131 stops operation of the cooling fan 24 while it keeps stopping of operation of the compressor 100 (S915).

Fifth Embodiment

The air compressor is designed such that the pressure of suction air is the barometric pressure. In the case of the air compressor, if the intake air pressure decreases, then the compression ratio in the inside of the compressor main body increases, resulting in increase in the motor output power, increase in the delivery temperature, and so forth.

FIG. 10 depicts a control flow for varying the number of rotations of the air compressor or adjusting the control pressure by acquisition of barometric pressure information. In the present embodiment, from position information about the compressor, barometric pressure information in the proximity of the installation position of the compressor is acquired, and the set upper limit pressure of the compressor is varied or the set speed of rotation of the compressor is changed in response to the value of the barometric pressure information such that excess output power of the electric motor and delivery temperature rise can be prevented.

In particular, in the present embodiment, the compressor 100 (air compressor) includes a delivery line pressure sensor (pressure sensor) that detects delivery pressure. The controller 13 calculates a compression ratio from barometric pressure forecasted at the position of the compressor 100 (air compressor) and delivery pressure detected by the delivery line pressure sensor 18 and changes, in a case where the compression ratio is equal to or higher than a predetermined value (fourth threshold value), the control pressure of feedback control or the number of rotations of the electric motor 4 to reduce the compression ratio. Consequently, excess output power of the electric motor 4 and temperature rise of delivery air can be prevented.

In particular, an upper limit compression ratio K for the compressor 100 is stored into the storage device 133 (S1010). The CPU 131 transmits position information Info1 to the management server 23*a* and receives point meteorological information Info3 corresponding to the position information Info1 from the management server 23*a*. The point meteorological information Info3 (meteorological information) includes barometric pressure forecasted at the position of the compressor 100 (air compressor). The CPU 131 acquires barometric pressure at present from the point meteorological information Info3 (S1011). The CPU 131 calculates a compression ratio from the barometric pressure at present acquired at S1011 (S1012).

The CPU 131 decides whether or not the compression ratio calculated at S1012 is equal to or higher than the upper limit compression ratio K (S1013). In a case where the compression ratio is equal to or higher than the upper limit compression ratio K (S1013: YES), the CPU 131 varies the control pressure of the compressor 100 or the number of rotations of the electric motor 4 such that the compression ratio becomes equal to the upper limit compression ratio K (S1014), and advances its processing to S1015. On the other hand, in a case where the compression ratio is lower than the upper limit compression ratio K (S1013: NO), the CPU 131 continues operation of the compressor 100 as it is (S1015).

According to the embodiment described above, it is facilitated to acquire meteorological information corresponding to the position of the compressor 100 (air compressor) and perform control according to the meteorological information.

Although the embodiments of the present invention have been described, the present invention is not restricted to the various configurations and processes described above and can be changed in various manners without departing from the scope and the spirit of the invention. For example, replacement of part of each embodiment is possible.

Further, although, in the embodiments described above, a refueling screw air compressor (refueling air compressor) is taken as an example, the present embodiments are not restricted to this, and various compressor types such as the volume type or the turbo type can be applied. Further, the present embodiments are not restricted to those of the refueling type in which oil or water is supplied into a compression chamber but may be non-refueling air compressors. Furthermore, although an electric motor is applied as the driving source for the compressor main body, the driving source may otherwise be formed using an internal combustion engine or a driving source that uses natural energy such as hydraulic power or wind power using a steam type driving source, an impeller, or the like. Further, although a variable speed machine that uses an inverter is taken as an example, also it is possible to use, as the variable speed machine, a resistor by a capacitor or the like, or a gear device or the like, or a fixed speed machine may be used. In other words, the electric motor 4 as the driving source may have a speed of rotation that is fixed or variable.

Although, in the embodiments described hereinabove, point meteorological information Info3 of the embodiments has the same data structure in order to simplify the description, only meteorological information necessary for each embodiment may be included in the point meteorological information Info3. The compressor 100 (air compressor) may be portable. In the embodiments described above, even if the position of the compressor 100 changes, the user need not input position information about the compressor 100.

Although the communication antenna 22a may include, for example, a module that includes a transmitter-receiver configured from an amplifier, a modem, and so forth, alternatively the controller 13 may include a transmitter-receiver. Further, although the position information antenna 22b may be a module that includes a GNSS receiver, alternatively the controller 13 may include a GNSS receiver.

It is to be noted that the configurations, functions, and so forth described above may partly or entirely be implemented by hardware by designing them, for example, as an integrated circuit. Alternatively, the configurations, functions, and so forth described above may be implemented by software such that a processor interprets and executes programs for implementing the functions. Information of programs, tables, files, and so forth for implementing the functions can be placed into a recording device such as a memory, a hard disk, an SSD (Solid State Drive), or a recording medium such as an IC card, an SD card, or a DVD.

It is to be noted that the embodiment of the present invention may have such forms as described below.

(1) An air compressor that includes: a compressor main body that compresses the air; a main electric motor that drives the compressor main body; an after cooler that cools the compressed air; a physical quantity detection sensor attached in a compressed air path or to an electric system section; a controller capable of calculating and storing an output of the sensor; a display unit capable of displaying a result from the controller; an antenna communicatable with a cloud server; and a function capable of acquiring information from the cloud server, in which the air compressor is capable of registering compressor position information into the cloud server and performing operation and stopping control of the air compressor based on metrological information acquired from the position information.

(2) The air compressor according to (1) is capable of acquiring temperature information from the metrological information and performing turning on/off of a freezing prevention device for preventing start-up congestion at the time of low temperature.

(3) The air compressor according to (1) is capable of acquiring temperature information from the metrological information and performing intermittent forced load operation in order to prevent start-up congestion at the time of low temperature.

(4) The air compressor according to (1) is capable of acquiring temperature information from the metrological information and performing forced unload continuous operation in order to prevent start-up congestion at the time of low temperature.

(5) The air compressor according to (1) is capable of acquiring temperature and humidity information from the metrological information and varying an opening and closing cycle of a drainage discharge solenoid valve.

(6) The air compressor according to (1) is capable of acquiring temperature and humidity information from the metrological information and keeping, when the internal temperature of the compressor is lower than an outside atmospheric temperature, the temperature difference between the internal temperature of the compressor and the outside atmospheric temperature to be equal to or more than a fixed value in order to prevent occurrence of condensation on an internal part of the air compressor.

(7) The air compressor according to (1) is capable of acquiring atmospheric temperature information from metrological information and causing a cooling fan to operate continuously from the atmospheric temperature information at the time of stopping of operation of the air compressor.

(8) The air compressor according to (1) is capable of acquiring barometric pressure information from metrological information and varying control pressure or the number of rotations of the compressor.

(9) The air compressor according to any one of (1) to (8) is a refueling air compressor that injects cooling oil into the compressor main body.

(10) The air compressor according to any one of (5) to (8) is a non-refueling air compressor that does not inject cooling oil into the compressor main body.

(11) The air compressor according to any one of (1) to (10) is capable of fixing or varying the speed of rotation of the main electric motor.

According to (1) to (11) above, it is possible to perform, in an air compressor capable of being connected to a cloud environment, maintenance and management of the compressor on the basis of information acquirable from the outside of the compressor, without attaching an additional sensor to the compressor.

DESCRIPTION OF REFERENCE CHARACTERS

1: Suction filter
2: Suction throttle valve
3: Compressor main body
4: Electric motor
5: Inverter
6: Oil separation tank
7: Check valve
8: After cooler
9: Air release solenoid valve
10: Temperature control valve
11: Oil cooler
12: Oil filter
13: Controller
14: Display unit
16: Power supply
17: Delivery temperature sensor
18: Delivery line pressure sensor
19: Current detector
20: Cord heater
22a: Communication antenna
22b: Position information antenna
23: Cloud
100: Compressor (package)

The invention claimed is:

1. An air compressor for compressing air, comprising:
a position information antenna that receives a position signal including position information about a sending source of a positioning radio wave;
a communication antenna that transmits position information about the air compressor and receives meteorological information corresponding to a position of the air compressor from a server on a cloud; and
a controller that specifies the position of the air compressor from the position signal and controls the air compressor based on the meteorological information corresponding to the position of the air compressor, wherein the meteorological information includes atmospheric temperature forecasted at the position of the air compressor at scheduled start-up time of the air compressor, the controller performs freezing prevention processing during the operation stop where the forecasted atmospheric temperature is a low temperature equal to or lower than a first threshold value.

2. The air compressor according to claim 1 includes a heater that warms an inside of the air compressor, wherein the controller turns on a power supply to the heater where the forecasted atmospheric temperature is a low temperature equal to or lower than the first threshold value.

3. The air compressor according to claim 1, wherein the controller controls the air compressor to perform intermittent forced load operation where the forecasted atmospheric temperature is a low temperature equal to or lower than the first threshold value.

4. The air compressor according to claim 1, wherein the controller controls, the air compressor to perform forced unload continuous operation where the forecasted atmospheric temperature is a low temperature equal to or lower than the first threshold value.

5. The air compressor according to claim 1 is a refueling air compressor.

6. The air compressor according to claim 1 includes an electric motor whose speed of rotation is fixed or variable as a driving source.

7. The air compressor according to claim 1 is portable.

8. An air compressor for compressing air, comprising:

a position information antenna that receives a position signal including position information about a sending source of a positioning radio wave;

a communication antenna that transmits position information about the air compressor and receives meteorological information corresponding to a position of the air compressor from a server on a cloud; and a controller that specifies the position of the air compressor from the position signal and controls the air compressor based on the meteorological information corresponding to the position of the air compressor, wherein the meteorological information includes atmospheric temperature and humidity forecasted at the position of the air compressor at time of operation of the air compressor, the air compressor includes a solenoid valve in a discharge path for drainage, and the controller calculates a discharge interval of the drainage from an amount of drainage according to the forecasted atmospheric temperature and humidity, and controls the solenoid valve to discharge the drainage at the discharge interval.

9. The air compressor according to claim 8 is a non-refueling air compressor.

10. An air compressor for compressing air, comprising:

a position information antenna that receives a position signal including position information about a sending source of a positioning radio wave;

a communication antenna that transmits position information about the air compressor and receives meteorological information corresponding to a position of the air compressor from a server on a cloud; and a controller that specifies the position of the air compressor from the position signal and controls the air compressor based on the meteorological information corresponding to the position of the air compressor, wherein the meteorological information includes atmospheric temperature forecasted at the position of the air compressor when operation of the air compressor is stopped, the air compressor includes a cooling fan that cools an inside of the air compressor, and the controller controls the cooling fan to continue to operate after operation of the air compressor is stopped where the forecasted atmospheric temperature is a high temperature equal to or higher than a third threshold value.

11. An air compressor for compressing air, comprising:

a position information antenna that receives a position signal including position information about a sending source of a positioning radio wave;

a communication antenna that transmits position information about the air compressor and receives meteorological information corresponding to a position of the air compressor from a server on a cloud; and a controller that specifies the position of the air compressor from the position signal and controls the air compressor based on the meteorological information corresponding to the position of the air compressor, wherein the meteorological information includes barometric pressure forecasted at the position of the air compressor, the air compressor includes a pressure sensor that detects delivery pressure, and an electric motor as a driving source, wherein the controller calculates a compression ratio from the forecasted barometric pressure and the delivery pressure, and decreases the compression ratio by changing a control pressure of feedback control or number of rotations of the electric motor where the compression ratio is equal to or higher than a fourth threshold value.

\* \* \* \* \*